United States Patent [19]
Looker et al.

[11] Patent Number: 5,765,978
[45] Date of Patent: *Jun. 16, 1998

[54] CARGO TRACK FITTING

[75] Inventors: Robert Looker, Carpenteria; Richard McLennan, Rancho Palos Verdes, both of Calif.

[73] Assignee: Satron, Inc., El Segundo, Calif.

[*] Notice: The term of this patent shall not extend beyond the expiration date of Pat. No. 5,609,452.

[21] Appl. No.: 758,628

[22] Filed: Nov. 27, 1996

Related U.S. Application Data

[63] Continuation of Ser. No. 608,298, Feb. 28, 1996, abandoned, which is a continuation of Ser. No. 164,147, Dec. 9, 1993, Pat. No. 5,609,452.

[51] Int. Cl.⁶ .................................................. B60P 7/08
[52] U.S. Cl. ........................ 410/105; 410/101; 410/104
[58] Field of Search ........................... 410/8–11, 96, 410/104, 101, 74, 75, 105; 244/118.1; 248/499, 503, 505; 24/68 CD, 115 K, 265 CD

[56] References Cited

U.S. PATENT DOCUMENTS

| | | | |
|---|---|---|---|
| 4,256,424 | 3/1981 | Knox et al. | 410/104 X |
| 4,496,271 | 1/1985 | Spinosa et al. | 410/8 X |
| 4,509,888 | 4/1985 | Sheek | 244/118.1 X |
| 4,796,837 | 1/1989 | Dowd | 410/101 X |
| 4,850,769 | 7/1989 | Matthews | 410/105 |
| 4,867,623 | 9/1989 | Loyd | 410/105 |
| 5,131,606 | 7/1992 | Nordstrom | 244/118.1 |
| 5,139,375 | 8/1992 | Franchuk | 248/499 X |
| 5,265,992 | 11/1993 | Jensen | 410/104 X |
| 5,609,452 | 3/1997 | Looker et al. | 410/105 |

FOREIGN PATENT DOCUMENTS

| | | | |
|---|---|---|---|
| 200511 | 12/1986 | European Pat. Off. | 410/96 |
| 787750 | 12/1957 | United Kingdom | 410/105 |

*Primary Examiner*—Stephen T. Gordon
*Attorney, Agent, or Firm*—Lyon & Lyon LLP

[57] ABSTRACT

An improved restraint apparatus for cargo carrying vehicles. Plate-like inserts are sandwiched together to form a body which can be secured to a conventional cargo tie-down track. One or more center inserts may be sandwiched between one or more peripheral inserts which mate with the standard railed track used in cargo vehicles. Peripheral inserts alone may also be used. A tie-down aperture is provided to allow lines to tie to or wrap around the body. A plunger attached to the inserts is biased by a spring to cause controlled movement of the plunger so that it mates with the track and can "fix" or "set" the apparatus where desired.

15 Claims, 3 Drawing Sheets

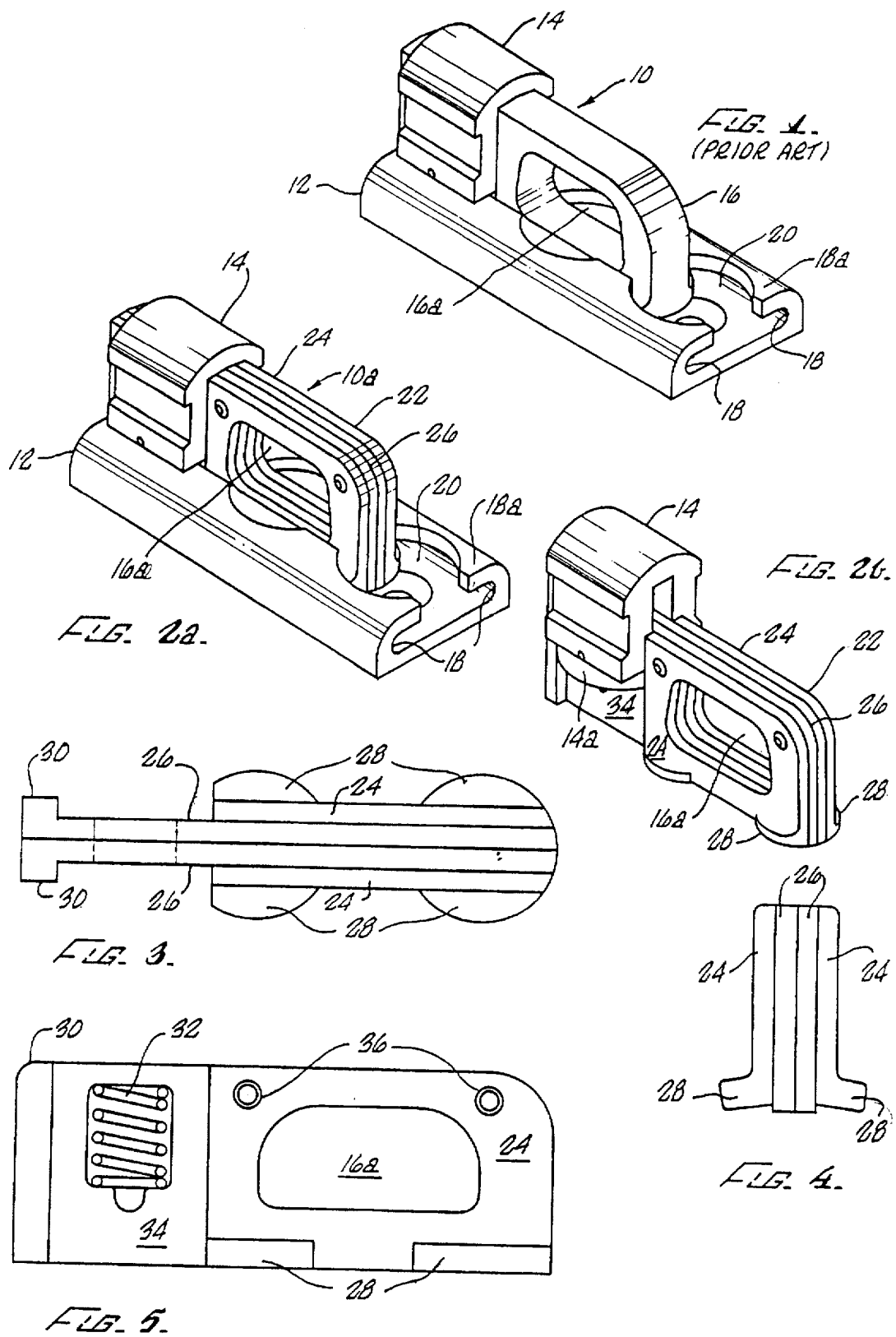

CARGO TRACK FITTING

This application is a continuation of a now abandoned application Ser. No. 08/608,298 filed on Feb. 28, 1996 which is a continuation of an application Ser. No. 08/164,147 filed on Dec. 9, 1993 which matured into U.S. Pat. No. 5,609,452.

The field of the invention is cargo restraint apparatus for aircraft and other vehicles. Freight carriers must not only move freight rapidly and reliably but economy is also a paramount concern. For example, air freight carriers often utilize light weight cargo pallets made of aluminum with attached cargo nets that are light in weight.

Various means are employed to secure these cargo nets (and hence the cargo) to the pallets. Most air cargo pallets have a standard inset track which consists of a pair of opposing rails that generally extend into a symmetrical top portion having regularly spaced apertures thereon. The cargo nets are then restrained within the pallet by removable track fittings which fit or slide into the rails of the pallet track, with the track providing longitudinal, lateral and vertical restraint of the fitting. Similar track sections may also be located on the aircraft floor for securing the pallets to the aircraft to avoid inflight shifting. The fitting itself comprises a body portion and a spring-biased plunger attached thereto. The plunger is shaped to mate with the apertures on the track so that it snaps into the track apertures, thus "locking" the fitting where desired.

The plunger securely fits within any of the track's regularly spaced apertures, which allows the user to secure the load at a variety of locations within the vehicle. The body of the fitting is provided with a sizeable opening which allows a rope or tie-down line to be slipped through or around the fitting, the rope or tie-down line being used to secure the cargo net or other restraint device to the track.

Conventional track attachment fittings are made of a monolithic body which is either machined from a solid block, forged from steel or made of cast iron. This is an expensive process. Costs can be reduced by constructing the body portion from one or more plate-like inserts which are sandwiched together. These inserts may then be secured together by rivets, welds or other conventional connecting means. These inserts can then each be provided with an opening so that when placed into the assembled configuration, the openings in the several pieces align and thus can be used to tie-down a load as with the conventional fitting. Accordingly, it is an object of the present invention to provide an improved cargo track fitting, but other and more detailed objects and advantages will appear to those skilled in the art from the following description and the accompanying drawings, wherein, FIG. 1 illustrates the conventional attachment fitting placed on the track showing the machined, forged or cast iron body;

FIG. 2a illustrates an embodiment of the present invention secured onto the track showing a body portion replaced by numerous inserts;

FIG. 2b illustrates the present invention removed from the track;

FIG. 3 is a plan view of the present invention with the plunger removed;

FIG. 4 is a front elevation view of the body of the present invention;

FIG. 5 illustrates a side view with the plunger removed and showing the spring;

Figure 6A:
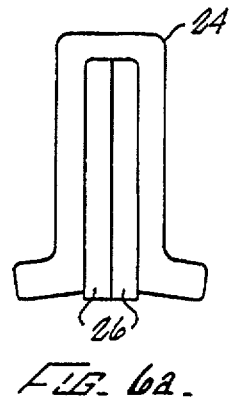
FIGS. 6a through 6d illustrate various side views utilizing different combinations of inserts.

Turning now to the figures, the conventional track fitting 10 positioned onto the track 12 is shown in FIG. 1. This conventional fitting 10 utilizes a plunger 14 slidably secured over a monolithic body portion 16 which is provided with a tie-down aperture 16a from the manufacturing process. The track 12 is comprised of symmetrically opposing rails 18 which generally extend into an upper portion 18a which is provided with the bored openings 20 as shown in FIG. 1 with the conventional fitting 10 and shown with the improved fitting-10a in FIG. 2a.

As shown in FIG. 2a, the improved fitting 10a comprises a plurality of inserts 22 which are generally rectangular shaped "plates" that are sandwiched together to mate with the track 12 and which is also provided with a plunger 14. As further shown in FIG. 2b without the track 12, this "sandwich" is comprised of peripheral inserts 24 placed on the outside or periphery of center inserts 26 with a similar tie-down aperture 16a therethrough The peripheral inserts 24 also comprise rounded extensions 28, as shown in FIGS. 3 and 4, to mate with the rails 18 of the track 12. These extensions 28 allow controlled longitudinal movement of the invention with respect to the track 12. As further shown in FIG. 3, the center inserts 26 may extend beyond the length of the peripheral inserts 24 and have end stops 30 at one end which further restrains longitudinal movement of the improved fitting 10a.

The plate inserts 22 are sandwiched together so that the rounded extensions 28 may slide between the rails 18 through the bored openings 20. In this embodiment, the plunger 14 has a rounded portion 14a which mates with the bored openings 20 on the track 12 and allows the fitting 10a to be "set" at various positions along the track 12.

Turning now to FIG. 5, a side view of the present invention is shown with the plunger 14 removed. A spring 32 is used to bias the plunger 14 into a lowered position. The plunger 14 is raised or lowered in a rectilinear motion along a plunger surface 34 provided generally on the center inserts 26. The inserts 22 may be secured together by welds or rivets 36, which are shown diagrammatically in FIG. 5.

Figure 6B:
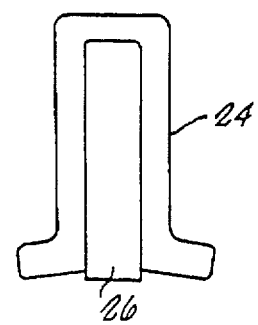
Figure 6C:
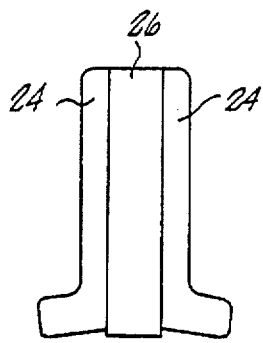
Figure 6D:
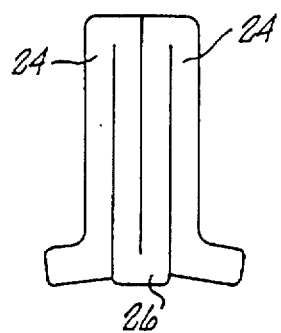
Figure 7:
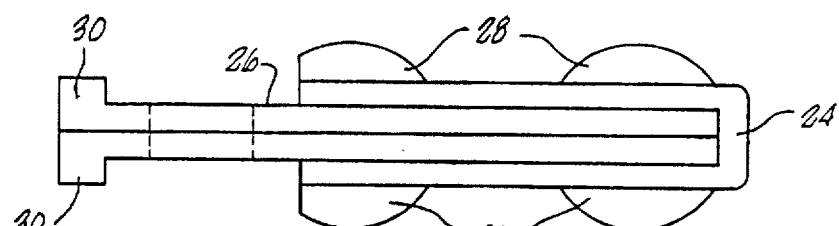
FIG. 7 is a plan view of one embodiment.
Figure 8:
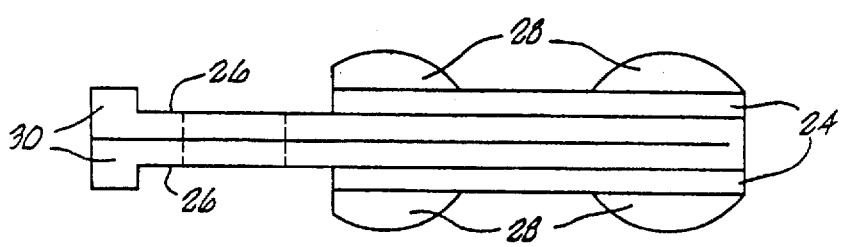
FIG. 8 is another plan view.
Figure 9:
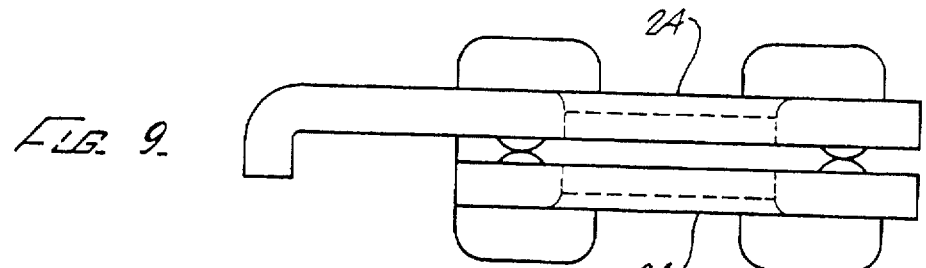
FIG. 9 is a plan view showing another embodiment with the inserts.
Figure 12:
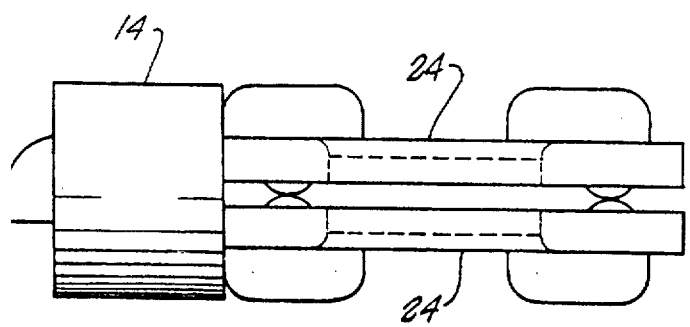
FIG. 12 shows the embodiment from FIG. 9 with the plunger attached.

Turning to FIGS. 6a through 6d, examples of the various side elevation views of the plate inserts 22 are illustrated in various combinations and showing that they are not limited in number. For example, FIG. 6a shows the use of one unitary peripheral insert 24 while FIG. 6b illustrates the use of a unitary center insert 26 also. FIG. 6c shows a single center insert 26 along with two peripheral inserts 24. FIG. 6d shows another option whereby the inserts 22 are connected together in an accordion fashion. FIGS. 7 and 8 illustrate two, but not all, possible configurations of the inserts 22 in plan view. FIG. 9 illustrates one configuration without center inserts 26 where a peripheral insert 24 has an extended length to restrain movement of the fitting 10a.

Figure 10:
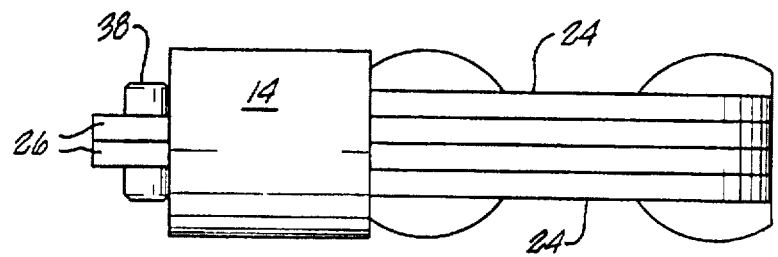
FIG. 10 is a plan view illustrating the pin and its placement on the present invention.
Figure 11:
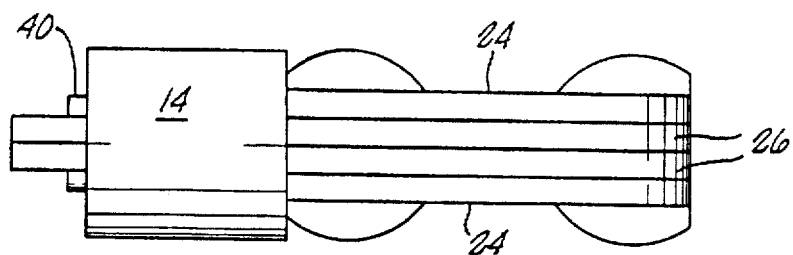
FIG. 11 is a plan view illustrating an alternative plunger guide and its placement on the present invention.

Referring to FIG. 10, a pin 38 which is slidably secured to the center inserts 26 may alternatively secure the plunger 14 onto the center inserts 26 to provide additional restraint against longitudinal movement. Alternatively, a plunger guide 40 may be used as shown in FIG. 11. This plunger guide 40 may be removable from the center inserts 26. FIG.

12 illustrates the placement of the plunger 14 with the embodiment shown in FIG. 9.

While the preferred embodiment of the present invention and modifications thereto have been shown and disclosed in the drawings and specification, alternate embodiments of the present invention may be apparent to a person of ordinary skill in the art and this application is intended to include those embodiments within the scope of the claims herein. Moreover, the present invention need not include all of the features disclosed in a single embodiment but rather one or more features may be included.

What is claimed is:

1. A removable fitting for engaging an inset cargo track, said fitting comprising:

a plurality of adjoining plate inserts having track engagement means for being removably engageable with said cargo track; and a plunger having a top portion and two spaced-apart sidewalls extending downwardly from said top portion, and said plunger further having track engagement means for being removably engageable with said cargo track;

wherein at least one said insert extends beyond the other said inserts in the longitudinal direction and said insert is secured between said sidewalls of said plunger.

2. The removable fitting of claim 1, wherein said inserts comprise one or more center inserts between one or more peripheral inserts, and at least one said center insert extends beyond the other said inserts in the longitudinal direction and is secured between said sidewalls of said plunger.

3. The removable fitting of claim 2, wherein said track engagement means is at the bottom portion of said peripheral inserts.

4. The removable fitting of claim 2, wherein said track engagement means of said inserts comprises lateral extensions of said peripheral inserts.

5. The removable fitting of claim 1, wherein said plunger further includes biasing means for biasing said plunger towards the bottom portion of said inserts to cause rectilinear movement of said plunger.

6. The removable fitting of claim 5, wherein said biasing means is a spring.

7. The removable fitting of claim 1, wherein said track engagement means of said plunger comprise rounded portions extending laterally from said sidewalls.

8. The removable fitting of claim 1, wherein said inserts further comprise end stops adjacent to said plunger.

9. The removable fitting of claim 1 further comprising a plunger guide secured adjacent to said plunger.

10. The removable fitting of claim 1 further comprising a restraining pin secured adjacent to said plunger.

11. The removable fitting of claim 1, wherein said inserts are secured together by rivets or welds.

12. The removable fitting of claim 1, wherein said inserts include tie-down apertures.

13. A removable fitting for engaging an inset cargo track comprised of a pair of opposing rails that extend into a generally symmetrical top portion having a channel and a plurality of regularly spaced apertures therein, said fitting comprising:

a main body portion having a plurality of adjoining plate inserts and track engagement means at the bottom portion of said main body portion for removably engaging said fitting to the cargo track through at least one of the plurality of regularly spaced apertures and for allowing controlled longitudinal movement of said fitting within the channel of the cargo track; and a plunger having a top portion and two spaced-apart sidewalls extending from said top portion;

wherein at least one said insert extends beyond the other said inserts in the longitudinal direction and said insert is secured between said sidewalls, and said sidewalls are engageable with said cargo track to permit rectilinear movement thereof so that said plunger can removably mate with one of the plurality of regularly spaced apertures in the cargo track.

14. The removable fitting of claim 13, wherein said fitting is capable of being engaged and disengaged from the cargo track when said plunger is lifted, said fitting is capable of controlled longitudinal movement within the channel of the cargo track when said fitting is engaged with the cargo track and said plunger is lifted, and said fitting is restrained in all directions by said cargo track when said fitting is engaged with the cargo track and said plunger is mated with one of the plurality of regularly spaced apertures in the cargo track.

15. The removable fitting of claim 13, wherein said inserts comprise one or more center inserts between one or more peripheral inserts, and at least one said center insert extends beyond the other said inserts in the longitudinal direction and is secured between said sidewalls of said plunger.

* * * * *